(12) United States Patent
Collin

(10) Patent No.: US 6,662,321 B1
(45) Date of Patent: Dec. 9, 2003

(54) MODEM USING PHASE COHERENCE TO ADAPT FOR MISSING TRANSMISSION SAMPLES

(75) Inventor: Zeev Collin, Irvine, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/532,346

(22) Filed: Mar. 21, 2000

(51) Int. Cl.[7] .................................. G06F 11/00
(52) U.S. Cl. .......................... 714/701; 375/222
(58) Field of Search .............................. 714/701, 710; 375/222, 219; 370/235

(56) References Cited

U.S. PATENT DOCUMENTS

| | | | |
|---|---|---|---|
| 4,037,049 A | * | 7/1977 | Lyon |
| 4,723,288 A | * | 2/1988 | Borth et al. |
| 5,315,284 A | * | 5/1994 | Bentley et al. |
| 5,721,830 A | * | 2/1998 | Yeh et al. |
| 6,295,314 B1 | * | 9/2001 | Cole ........................ 375/222 |
| 6,327,249 B1 | * | 12/2001 | Cookman et al. ........ 370/235 |
| 6,501,790 B1 | * | 12/2002 | Livshin .................... 375/222 |

* cited by examiner

*Primary Examiner*—Phung M. Chung
(74) *Attorney, Agent, or Firm*—Christopher J. Rourk; Akin Gump Strauss Hauer & Feld, LLP

(57) ABSTRACT

The present invention envisions the use of a coherent signal to make up for lost or delayed samples to a modem. The modem contains a coherent phase buffer containing samples of at least a cycle of a coherent signal corresponding to an outgoing signal. When, for any reason, the samples for the outgoing signal are lost or delayed, the modem adaptively patches the outgoing signal with samples from the coherent phase buffer. The modem tracks the outgoing signal, and synchronizes a pointer into the coherent phase buffer outgoing signal. Thus, when the outgoing signal samples are delayed or lost, the modem may replace the invalid samples from the samples of the outgoing data signal with a patch of an appropriate sample or samples from the coherent phase buffer. As such, disruptions of the modem session associated with an incoherent signal during modem communications are avoided.

20 Claims, 4 Drawing Sheets

MODEM USING PHASE COHERENCE TO ADAPT FOR MISSING TRANSMISSION SAMPLES

BACKGROUND OF INVENTION

1. Technical Field

This invention relates to modem technology, and more particularly, to a modem that adjusts for missed code samples during transmission of data.

2. Related Art

During transmission of data, modems typically buffer digitized data representing the analog transmission for that transmission. This buffered data is originally processed by the main central processing unit of a host computer and transferred to the modem via a link over an internal bus in the computer.

The data to be transmitted to the remote unit is processed by the host computer into digital samples representing the outgoing analog signal and are stored in the memory of the host computer, awaiting transfer to the modem. Upon transfer to the modem, the digitized samples are stored within a transmit buffer in the modem. When the data is to be transmitted to a remote modem, the modem performs a digital to analog conversion on these digitized samples. The modem then outputs the resulting analog waveform across the communication link to the other modem.

On the other end, when the modem receives analog signals from another modem, the receiving modem typically digitizes the analog waveform as samples and store these samples in an internal buffer. The modem then ships the digitized samples of the analog waveform to the host computer's memory via an internal bus, where the host computer processes the samples to recover the embedded data in the original analog signal.

However, in a typical host computer system, instant and timely access the memory across the bus is not always present. Since the digitized data must be shipped across a bus shared with numerous devices and peripherals associated with a computer a delay in the use of the bus can cause the transfer of the digitized samples to take longer than expected. This delay can cause a disruption in the flow of digitized samples from the host computer memory to the modem.

When this delay occurs, the modem may exhaust all of the data in the transmit buffer. When the transmit buffer has exhausted the supply of digitized samples representing the output analog signal, an indeterminate signal can be output by the modem.

The sending of the unspecified signal across the communication link could result in abnormal noise in the transmitted audio waveform. In a worst case scenario, the abnormalities may include a disruption in the phase of the audio waveform. Different varieties of abnormal waveforms are diagrammed in FIGS. 1a and 1b.

FIG. 1a is a timing diagram of an analog signal 100 output by a modem when the transmit buffer is in an underflow condition. In the period before a time T1, the transmit buffer is not in an underflow situation and has valid data corresponding to samples of a valid transmitted waveform. However, at the time T1 the transmit buffer enters into an underflow situation, perhaps caused by a delay in receiving digitized samples from a main memory. The resulting analog signal transmitted by the modem at the time T1 is very noisy, due to the fact that no coherent data is being output.

FIG. 1b is a diagram of an even worse case scenario. The modem is outputting an analog signal 150 to a remote modem. The transmit buffer of the modem is operating normally until a time T2. However, at the time T2 an underflow in the transmit buffer occurs, again perhaps caused by the delay in receiving the digitized samples representing the output analog waveform 150 from a main memory or other peripheral device. This described delay is among other types of delays inherent in computer systems that could cause the transmit buffer to underflow.

At the time T2, the modem cannot transmit valid, coherent data over the communication link. As such, the modem proceeds to transmit an out of phase signal.

An out of phase, non-coherent, or noisy signal is extremely destructive in terms of a modem session. The transmissions of extremely noisy data, such as depicted in FIG. 1a, or the transmission of a non-coherent, discontinuous signal, such depicted as in FIG. 1b may lead to lower performance in the modem. In fact, even more destructively, these types of signals may cause a termination of a communication link between another modem.

Other aspects of the present invention, as well as shortcomings of the prior art will become apparent with further reference to the drawings and specification that follow.

BRIEF SUMMARY OF THE INVENTION

In short, the invention relates to a modem that is able to adapt to missed transmission samples by supplying a patch signal for the missing samples. The patch samples do not affect the operation of the modem in a communication session that it is currently engaged.

In one embodiment, the modem is made up of a conversion circuitry, a buffer for storing samples from the conversion circuitry, and a second buffer containing samples of a substitute signal. The modem recieves digital samples from a main computer, which are then stored a transmission buffer. The modem transforms the digital samples into an analog signal, which it then outputs. The digital samples are transformed into the analog signal by the conversion circuitry A second buffer contains digital samples of a substitute analog signal. When the modem determines that no further valid digital samples are available in the transmission buffer, the digital samples from the second buffer are substituted as input to the conversion circuitry. The conversion circuitry transforms the digital samples contained in the second buffer into an analog output coherent with the prior output signal. Thus, the output of the modem is uninterrupted due to the lack of digital samples in the transmission buffer, and transmits a coherent analog signal that will not impair the communication session.

In one embodiment, the contents of the second buffer are tracked or synchronized with the output of the digital samples from the first buffer to the conversion circuitry. As such, a related digital sample from the second buffer may be substituted seamlessly with the prior digital samples sent form the transmission buffer. Thus, the resulting analog signal output from the conversion circuitry is seamless as well.

In another exemplary embodiment, the digital samples in the second buffer are indicative of a signal coherent with the signal as represented by the samples in the transmission buffer. Thus, the substitution of a sample from the second buffer for a missing sample in the transmission buffer results in a coherent output from the conversion circuitry.

In another embodiment, the second buffer stores samples of a cyclical signal. Further, the second buffer stores samples indicative of at least one cycle of the cyclical signal. In this way, a patch from the second buffer is readily available at any point in the output cycle. This gives the modem the ability to graft the delayed signals from the computer onto the ongoing output analog signal.

Other aspects of the present invention will become apparent with further reference to the drawings and specification that follow.

DETAILED DESCRIPTION OF THE INVENTION

Figure 1A:
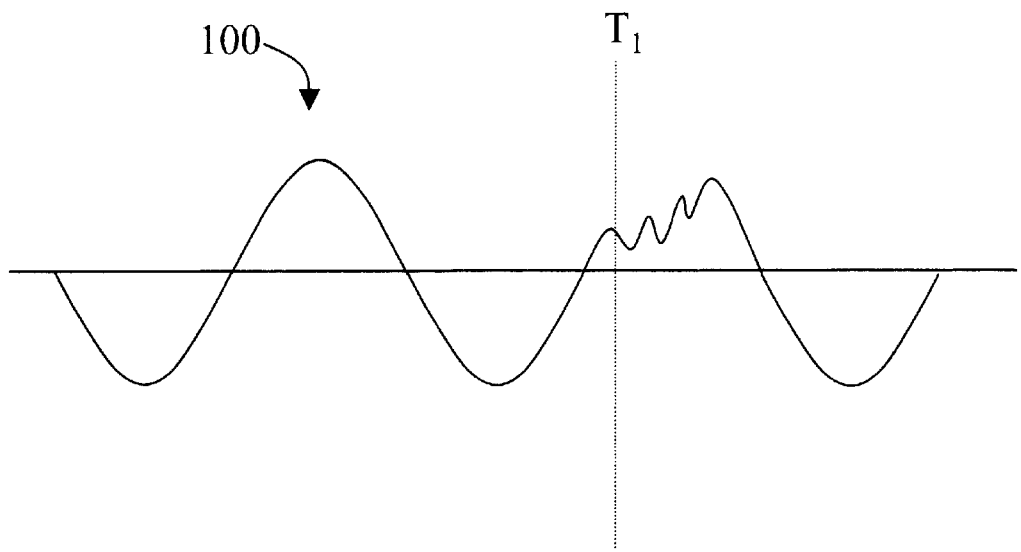
FIGS. 1a and 1b are timing diagrams of analog signals output by a modem when the transmit buffer has experienced an underflow or signals representative of missed samples from an overflow condition in a reception buffer.
Figure 1B:
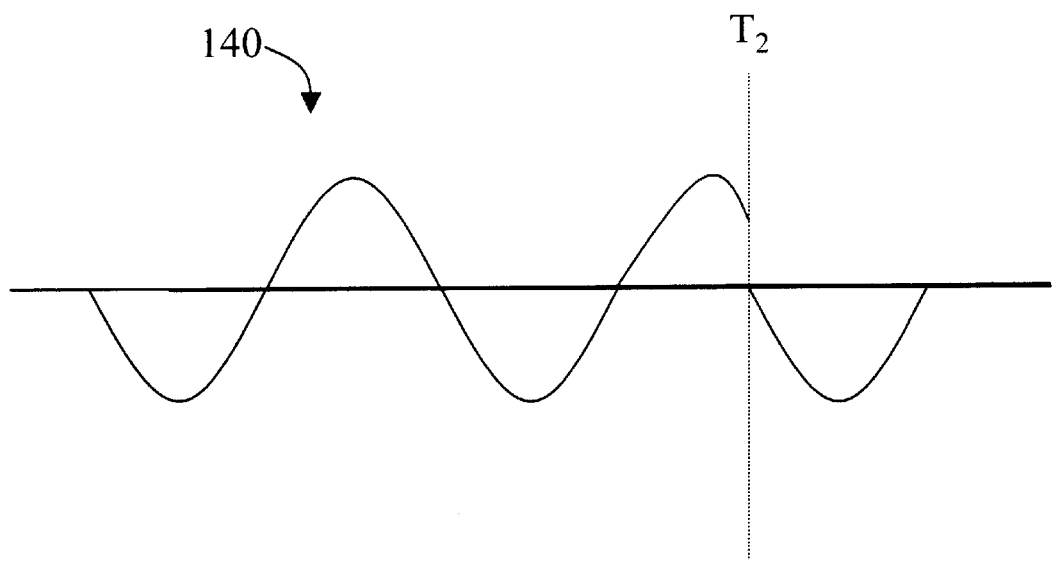
Figure 2:
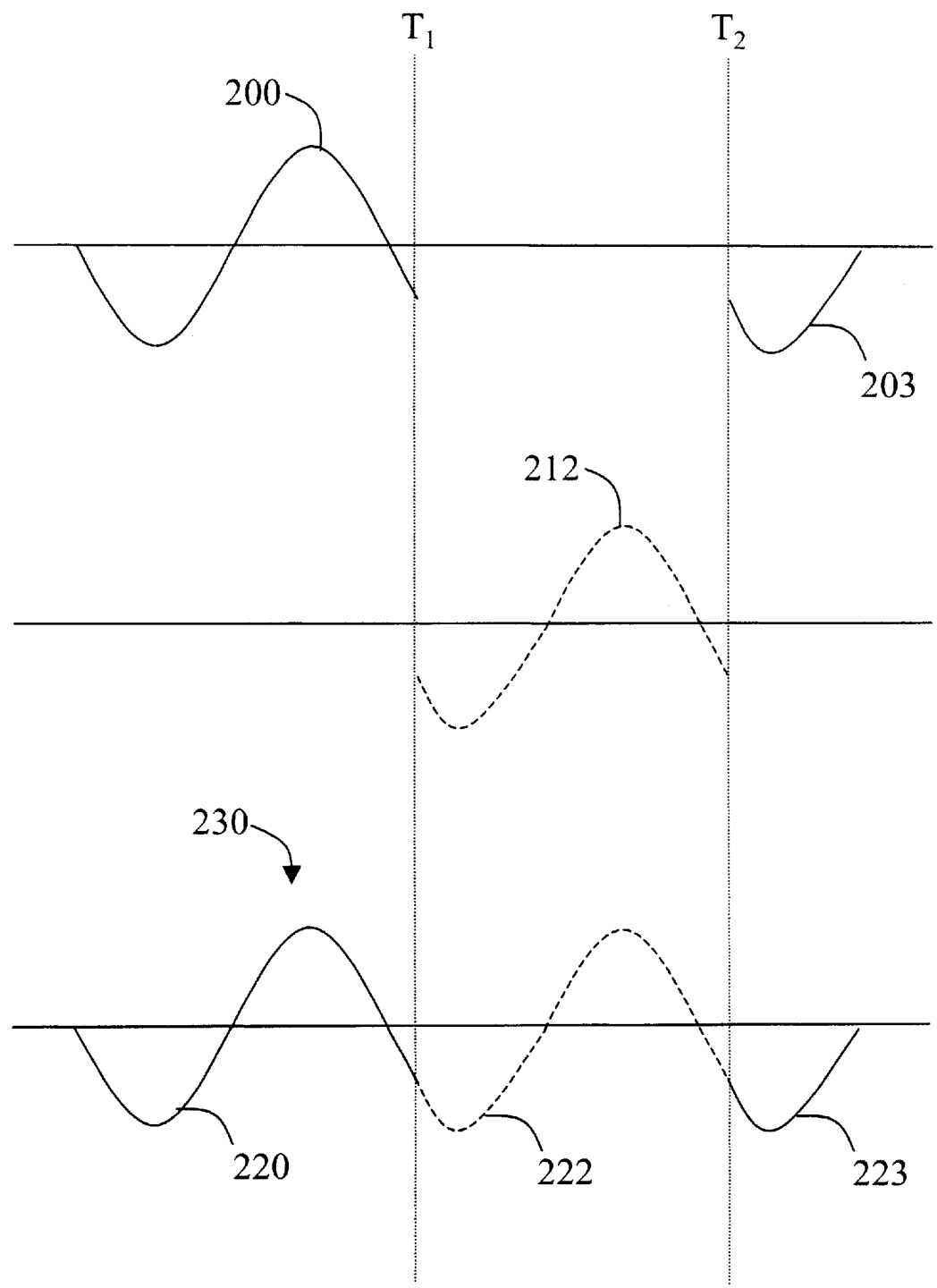
FIG. 2 is a timing diagram of an analog output of a modem with missing samples, a patch analog output tracked by the modem to compensate for the missing signal samples, and a resulting composite signal output by the modem according to the invention.

FIG. 2 is a timing diagram of an analog output of a modem with missing samples, a patch analog output tracked by the modem to compensate for the missing output signal samples, and a resulting composite signal output by the modem according to the invention. Assume that a modem is transmitting data, exemplified by an analog signal 200. Samples corresponding to the analog signal 200 are present in a transmit buffer of a modem. The samples are converted to the analog signal 200 and output on a communication line.

At a time T1, the transmit buffer experiences an underflow situation. As, such no valid data samples are present in the transmit buffer to be converted and transmitted. However, the data sample stream is resumed at a time T2, at which time the underflow situation in the transmit buffer is corrected. As such, an analog output signal 204 may be resumed at that time. However, the in the time between the time T1 and the time T2, no valid samples of an analog output signal are present in the transmit buffer that may be converted and output by the modem.

However, the modem may compensate for the lost transmission samples by patching the output signal with an in-phase, non-noisy, coherent waveform, as indicated by an analog waveform 212. The modem stores digitized samples of a patching waveform.

In this case, the modem tracks the output waveform. This enables the modem to patch the output waveform in the proper location. Thus, the modem may supply a patching waveform 212 by supplying alternate digital samples corresponding to the patching waveform 212 to the output in lieu of the invalid digital samples in the transmit buffer. This substitution continues while the transmit buffer is in an underflow situation. In one exemplary embodiment, the patching waveform corresponds to a "dataless" waveform; thus no information is transmitted in the patch.

As such, the modem, upon the indication of an underflow situation in the transmit buffer, supplies a patching waveform 212 to the output until the underflow situation is corrected. Thus, the modem supplies an uninterrupted, continuous, coherent, and non-noisy waveform 230 as the analog output to the communication link.

The modem supplies the samples corresponding to the waveform in the time before the time T1 from the transmit buffer, as indicated by the waveform segment 220. In the time between the time T1 and the time T2, the analog output generated by the modem is derived from those samples corresponding to the patch waveform generated internally, as indicated by the waveform segment 222. The patch waveform is continued until the underflow situation is corrected at the time T2. At the time T2, the samples of the delayed new data flowing into the transmission buffer are resumed. At this point, the transmission from the delayed data may be resumed, as indicated by the waveform segment 224.

Figure 3:
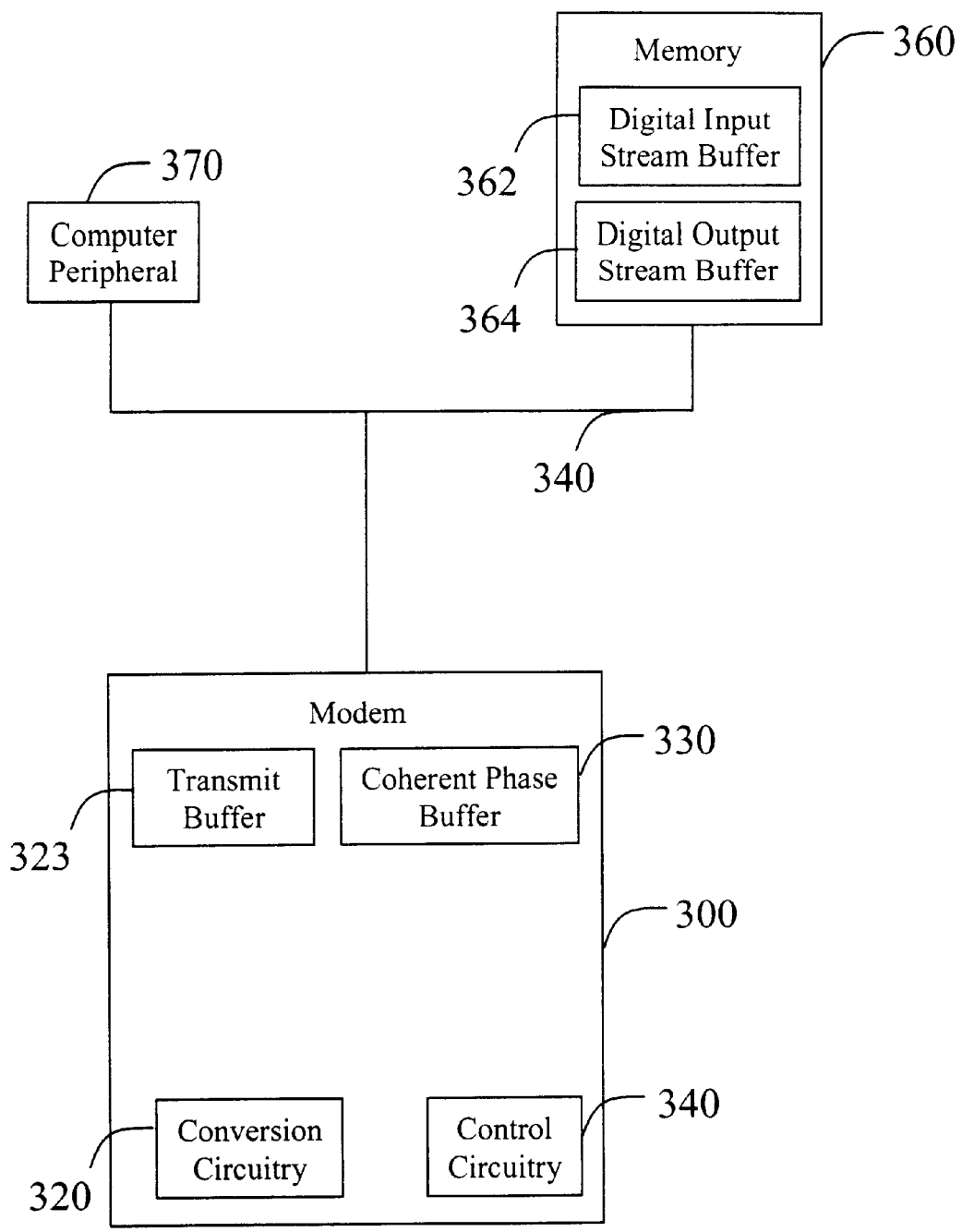
FIG. 3 is a schematic block diagram of an embodiment of a device that performs a phase coherence adjustment for missed code samples according to the invention.

Thus, an analog output waveform 230 is a composite waveform. The composite waveform is made up of the waveform segments 200, 212, and 204. In this manner the communication session is not affected by the absence of samples in the period of time between the time T1 and the time T2. FIG. 3 is a schematic block diagram of an embodiment of a device that performs a phase coherence adjustment for missed code samples according to the invention. FIG. 3 is an internal schematic of a host computer containing a modem 3300. The host computer contains a computer bus 350, a memory 360, and another device 370 operably coupled to the computer bus 350 and possibly requiring access to the memory 360.

Within the memory 360 is a digital input stream buffer 362 and digital output stream buffer 364. The digital output stream buffer 364 is an area of memory in which digital samples corresponding to an output analog transmission signal is stored before sending to the modem 330 for final transmission.

When transmitting data, the modem may utilize the digital output stream buffer 364 of the memory 360 to create digitized samples of output analog signal. Or, the modem may output these digitized samples from a digital signal processor.

Periodically, the modem 300 requests a block of the digitized samples contained in the digital output stream buffer 364 in the memory 360 for output to a remote modem as an analog output signal. Or, these digitized samples may be requested from a specialized piece hardware, such as a digital signal processor.

In either case, this requested block of samples is transferred across the computer bus 350 and into the transmit buffer 324 contained within the modem 3300. There, the digitized samples of the analog output signal are sent to the conversion circuitry 320. The conversion circuitry 320 converts the digitized samples of the analog output signal to a resulting analog output signal. This analog signal is output through the input/output port to a remote modem.

However, when the computer peripheral device 370 requests data from the memory 360, that request may block the modem 3300 from obtaining the digitized samples stored in the memory 360. Or, the computer peripheral device 370 may request another peripheral device supply some data using the computer bus 350. Again, access to the computer bus 350 would be blocked from the modem 3300. As such, the digitized samples corresponding to the output of the modem 300 might be delayed.

When other devices are using the computer bus 350, or when other devices block access to the memory 360, this causes the digitized samples to be blocked from the modem 3300. When this situation occurs, the transmission buffer 324 may enter an underflow state.

Additional control circuitry 340 may also present with the modem 3300. This control circuitry 340 may be onboard to the modem. Or the control circuitry may be a remote processor running the functional protocol of the modem, as might exist in a software modem. Thus, the control circuitry 340 controls the functional aspects of operating the transmission buffer.

The modem 300 also contains a coherent phase buffer 330. This coherent phase buffer 330 contains data corresponding to samples of an analog signal that the modem may use in patching an output analog signal as it waits for delayed data from the main computer.

The processing circuitry 340 allows the modem to direct the introduction and matching of the phase coherent samples to the output signal. As such, when the digitized samples are delayed from the memory 360, the modem may use the digitized samples in the coherent phase buffer 330 to adjust for any missed samples because of these delays.

In an embodiment of the invention, the representation of the signal contained in the coherent phase buffer 330 is "dataless", meaning that it is representative of a carrier wave containing no embedded data. With such a wave, the contents of the coherent phase buffer may be used in the "patching" functions in building a phase coherent analog signal that adjusts for missed code samples.

For example, in the case where the transmission buffer 324 experiences an underflow due to a lack of samples from the memory 360, the modem 300 can compensate for this situation by providing digitized samples from the coherent phase buffer 330 to the conversion circuitry 320. These samples from the coherent phase buffer 330 represent an analog signal that is in phase, coherent with, and non-discontinuous from the ongoing output signal.

First, an underflow condition in the transmission buffer 324 is detected by the modem 300. Upon an indication that this event had occurred, the modem 300 would send the samples from the coherent phase buffer 330 corresponding to an analog signal coherent with the ongoing output signal to the conversion circuitry 320. Upon an indication from the modem 300 that the underflow condition in the transmission buffer 324 no longer exists, the modem 300 ceases sending the samples in the coherent phase buffer 330 to the conversion circuitry 320.

As such, for the time that the underflow condition exists, the sample stream from the coherent phase buffer 330 replaces a sample stream from the transmission buffer 324. When the underflow condition lifts, the samples from the transmission buffer 324 replace those from the coherent phase buffer 330, since valid digital samples of an analog output signal are now present in the transmission buffer 324 and are available for output to the conversion circuitry 320.

It should be noted that the portions of the modem 300 may exist in hardware, or in software, or in some combination thereof. For example, the coherent phase buffer 330 or the transmission buffer 324 may be implemented in software, as well as being implemented in physical embodiments.

The coherent phase buffer may also be used in another manner. The modem 300 may monitor the status of the transmission buffer 324. When the level of the outgoing samples in the transmission buffer 324 reaches a predetermined low level, the modem 300 may start to use the appropriate samples out of the coherent phase buffer 330. In this manner, the level of valid samples in the transmission buffer always remains positive. When the level of valid samples reaches a level in which the modem can operate in a normal manner again, the modem 300 will again substitute back to using the samples from the transmission buffer 324.

Figure 4:
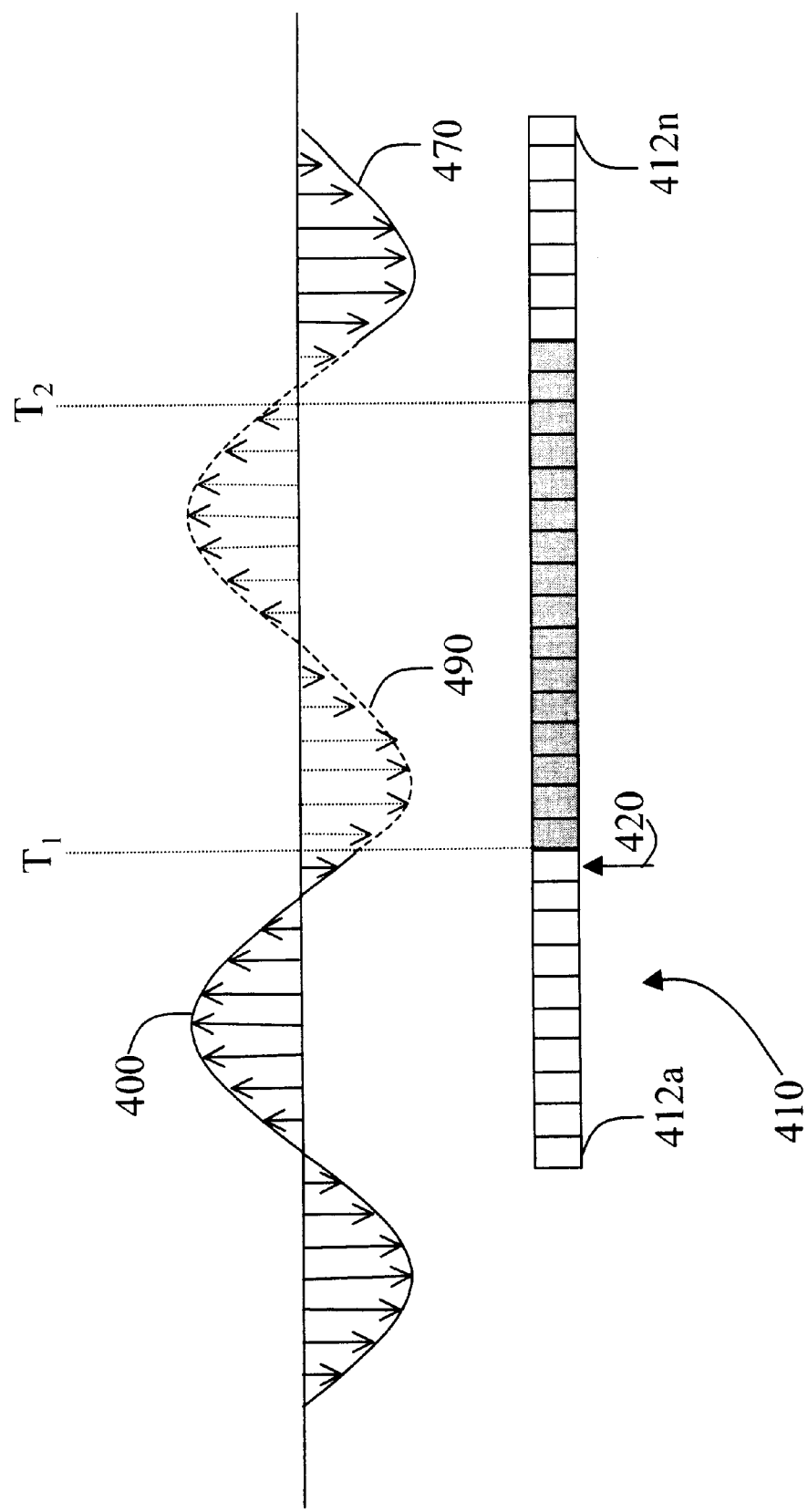
FIG. 4 is a timing diagram showing the interaction of an outgoing analog signal, and the coherent phase buffer of FIG. 3.

FIG. 4 is a timing diagram showing the interaction of an outgoing analog signal, and the coherent phase buffer of FIG. 3. First, a modem produces an outgoing analog transmission signal 400. The modem receives digitized samples of the outgoing data, represented by the solid arrows within the signal 400, from a computer memory. The modem puts these samples into a transmission buffer, from where the samples are sent to a conversion circuitry. The conversion circuitry converts the digital samples into the signal 400.

A coherent phase buffer 410 contains samples 412a–n of a signal that correspond to the output carrier signal of the modem. As the samples in the transmission buffer are sent to the conversion circuitry and later output as an analog signal, a pointer 420 marks the sample in the coherent phase buffer 410 containing a corresponding sample of the analog output signal coherent with the outgoing signal. As each sample in the analog signal is sent to the conversion circuitry, the pointer 420 into the coherent phase buffer is incremented. As such, the modem tracks the appropriate point in the coherent phase buffer 410 corresponding to a proper start of a potential patch wave.

At a time T1, the transmission buffer has gone into an underflow condition. As such, no valid samples are available in the transmission buffer that may be processed into a proper analog output signal. However, when this condition occurs, the pointer 420 into the coherent phase buffer 410 will mark an appropriate start point from which the modem may make available to the conversion circuitry a coherent patch waveform. While the transmission buffer is still in an underflow condition, the modem will output samples from the coherent phase buffer 410 to the conversion circuitry. The conversion circuitry then transforms the samples from the coherent phase buffer into an analog signal which is then output to the remote modem over a communication link.

The coherent patch signal is denoted as a dashed analog signal 490, and the samples from the coherent phase buffer 410 making up the coherent patch signals are denoted as dashed arrows beneath the coherent patch signal. Each of the samples making up the coherent patch signal is taken the coherent phase buffer 410, denoted as shaded.

Assume that the underflow condition ceases at the time T2. Outputting the next valid sample in the transmission buffer at that time would not be coherent. Thus, the patch waveform from the coherent wave buffer must be continued until the valid samples contained in the transmission buffer may be coherently reattached to the outgoing analog signal.

As such, the samples from the coherent phase buffer must be supplied to the conversion circuitry until a suitable reattachment of the next valid sample in the transmission buffer is possible. Thus, the shaded samples in the coherent phase buffer 410 must be output, allowing attachment of the next valid data sample in the transmission buffer to the coherent patch signal. As such, the coherency and stability of an outgoing analog signal is maintained in presence of missed samples.

As such, a system describing the addition of phase coherent samples to make up for lost samples is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

I claim:

1. A modem comprising:
   a conversion circuitry that converts samples of a digital data signal to an analog output signal;
   a first buffer, communicatively coupled to the conversion circuitry, storing samples of a first signal;
   a second buffer, communicatively coupled to the conversion circuitry, storing samples of a second signal;
   a control circuitry, coupled to the first buffer and the second buffer, controlling the source of the samples to the conversion circuitry; and
   the samples of the first signal are sent to the conversion circuitry when valid samples of the first signal are available in the first buffer, and otherwise samples from the second signal are sent to the conversion circuitry.

2. The modem of claim 1 wherein the modem tracks the samples of the first signal sent to the conversion circuitry, and concurrently tracks corresponding samples of the second signal, such that a sample of the second signal related to the last sent sample of the first signal is sent to the conversion circuitry when valid samples of the first signal are not available.

3. The modem of claim 1, wherein the first sample of the second signal sent to the conversion circuitry is coherent with the last sample of the first signal sent to the conversion circuitry.

4. The modem of claim 1 wherein the output signal is coherent when the source of the output samples to the conversion circuitry changes from the samples from the first signal to the samples from the second signal.

5. The modem of claim 1 wherein the first buffer receives the samples of the first signal from a computer memory.

6. The modem of claim 1, wherein the second signal stored by the second buffer is indicative of at least one cycle of a cyclical signal.

7. The modem of claim 6 wherein the samples of the second signal are indicative of a dataless analog signal to be transmitted to the a second modem.

8. The modem of claim 7, wherein the output signal is coherent when the modem changes the samples of the output signal from the samples of the second buffer to the samples of the first buffer.

9. The modem of claim 7 wherein the modem substitutes the samples of the second signal as the data signal to the conversion circuitry when the samples of the first signal are delayed in reaching the first buffer.

10. The modem of claim 7 wherein the modem tracks a corresponding next one of the samples of the second signal concurrently with sending a particular sample of the first signal to the conversion circuitry.

11. The modem of claim 7 wherein a first sample sent to the conversion circuitry from the samples of the second signal is coherent with a last sent sample from the samples of the first signal.

12. The modem of claim 7 wherein the substitution of the one or more samples of the samples of the second signal for the samples of the first signal is not detrimental to the operation of the communication session.

13. The modem of claim 1 wherein the samples of the first signal are indicative of an analog signal containing data to be transmitted to a second modem.

14. The modem of claim 1, wherein when the modem is sending the samples from the second buffer to the conversion circuitry, the modem reverts back to sending the samples from the first buffer when valid samples are again present in the first buffer.

15. A modem for sending an output signal to a destination during a communication session, the modem comprising:
   a conversion circuitry, communicatively coupled to the destination, converting samples of a data signal to an output signal;
   a first buffer, communicatively coupled to the conversion circuitry, storing samples of a first signal; and
   a second buffer, communicatively coupled to the conversion circuitry, storing samples of a second signal wherein the first buffer supplying the samples of the first signal to the conversion circuitry as the samples of the data signal when the samples of the first signal are valid, the second buffer substituting one or more samples of the samples of the second signal for the samples of the first signal when the first buffer has no valid samples of the first signal.

16. A modem, operably coupled with a computing device, the modem comprising:
   a conversion circuitry converting samples of a data signal to an output signal;
   a first buffer, communicatively coupled to the conversion circuitry and to the computing device, storing the samples of the data signal;
   a second buffer, communicatively coupled to the conversion circuitry, storing samples of a second signal; and
   a control circuitry, coupled to the first buffer and the second buffer, selecting the source of the samples of the data signal between the first buffer and the second buffer wherein the control circuitry selecting the samples from the first buffer when the first buffer contains valid samples of the data signal, and selecting the samples from the second buffer when the samples from the first buffer are not valid.

17. The modem of claim 16 in which the control circuitry tracks the samples of the data signal as they are sent to the conversion circuitry, and tracks corresponding samples of the second signal, such that a sample of the second signal related to the last sample of the data signal sent to the conversion circuitry is sent to the conversion circuitry when the samples of the data signal are not valid.

18. The modem of claim 16, wherein a first sample of the second signal sent to the conversion circuitry is coherent with the last sample of the data signal sent to the conversion circuitry.

19. The modem of claim 16, wherein the samples of the second signal are indicative of at least one cycle of a cyclical signal.

20. The modem of claim 16 wherein the first buffer is a transmit buffer and the second buffer is a coherent phase buffer, and where the coherent phase buffer is used only when there is no new data in the transmit buffer.

* * * * *